United States Patent
Condon et al.

[15] 3,662,567
[45] May 16, 1972

[54] QUICK DISCONNECT COUPLING

[72] Inventors: William T. Condon; Joseph P. Meli, both of Rockford, Ill.

[73] Assignee: Twin Disc, Incorporated, Racine, Wis.

[22] Filed: Jan. 13, 1971

[21] Appl. No.: 106,103

[52] U.S. Cl. ................................................. 64/6, 287/130
[51] Int. Cl. ............................................................. F16d 3/16
[58] Field of Search .................... 64/1 C, 6; 287/79, 129, 130

[56] References Cited

UNITED STATES PATENTS

| | | | |
|---|---|---|---|
| 58,330 | 9/1866 | Winslow | 287/130 |
| 1,226,475 | 5/1917 | Deck | 287/130 X |
| 2,803,474 | 8/1957 | Wilson | 287/129 |

*Primary Examiner*—Kenneth W. Sprague
*Attorney*—James E. Nilles

[57] ABSTRACT

A quick disconnect coupling for a power transmission or the like and including a pair of separable flanges each having tapered opposed surfaces, clamps provided for said opposed surfaces to thereby releasably clamp said flanges together, quick releasable means for holding said clamps against said tapered surfaces of said flanges, and resilient means for urging said clamps off of the tapered surfaces of the flanges when the coupling is to be released. The coupling includes means between the flanges for transmitting torque therebetween and thereby drivingly connecting them together when the clamps are acting to rigidly hold the flanges together. Piloting means are also provided in one of the flanges for piloting the other flange thereon to thereby facilitate assembly of the unit. The coupling finds particularly utility in connection with a universal joint and one of the flanges of the coupling is rigidly secured to the yoke of of such a universal joint.

9 Claims, 7 Drawing Figures

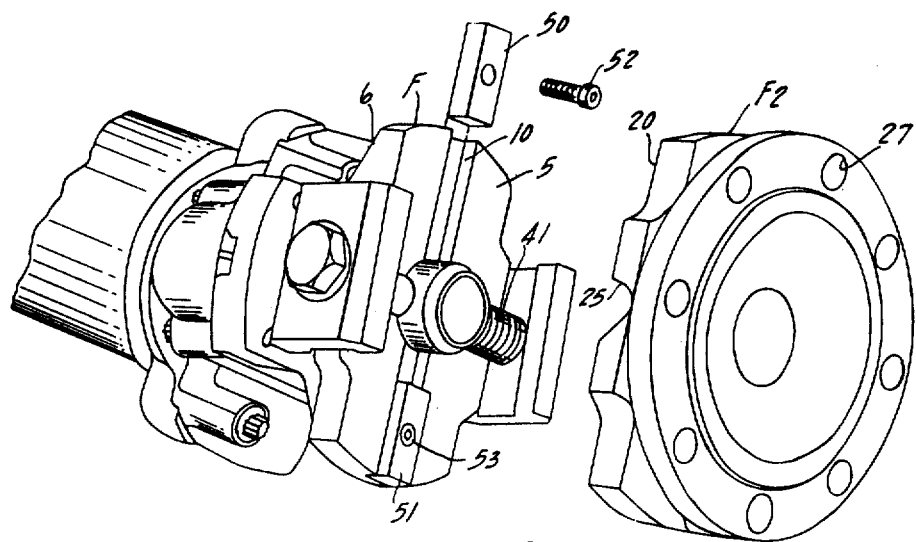
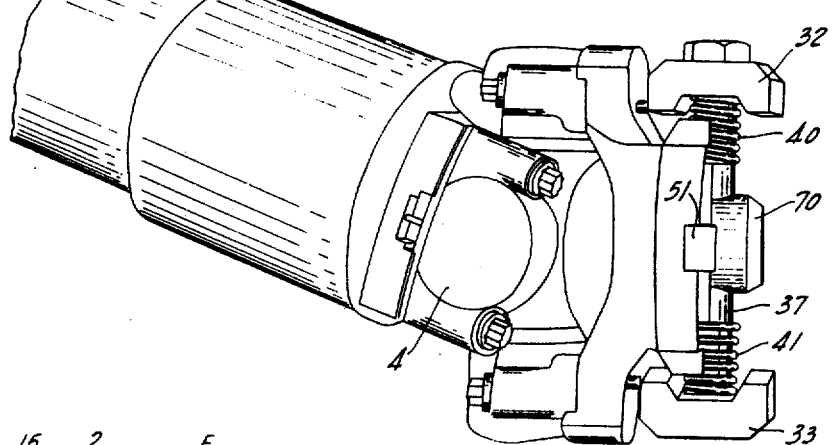
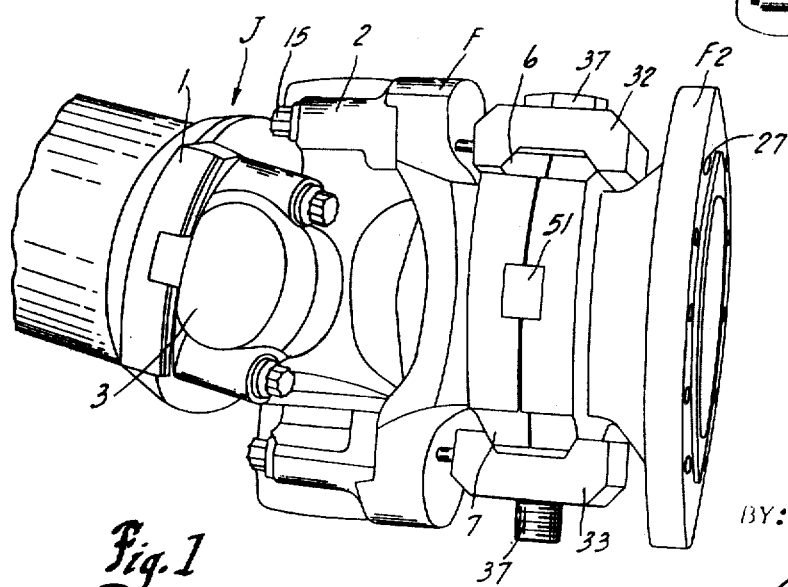

QUICK DISCONNECT COUPLING

BACKGROUND OF THE INVENTION

In power transmissions or the like it is necessary to rapidly disconnect the driven machinery from the driving member and this disconnection must be made easily and also be capable of quick coupling when the drive is to be re-established. Prior art couplings have been proposed and used with considerable success and which have driver and driven flanges that are releaseably held together by push pins, bayonet type locks, or the like. The transmission of the torque is usually accomplished by face keys, face gear teeth, or friction surfaces in the clamped up flanges; also splines or keys are used with push pins and bayonet type locks in some prior art devices. Many of these couplings utilize clamped flanges employing one or two bolts which must be loosened to accomplish the disconnection of the coupling. These prior art devices are generally complex and require considerable time to assemble and disassemble the coupling. Furthermore, the various parts utilized in such prior art devices often become misplaced and it is difficult to assemble them under certain conditions.

SUMMARY OF THE INVENTION

The present invention provides a quick disconnect coupling for a power transmission or the like, the coupling having a pair of disconnectible flanges which abut against one another, the flanges having opposed tapered surfaces which are engageable by a complementary tapered clamp that is urged into engagement with the tapered surfaces of the flanges. The clamps are releasably held against the tapered surfaces of the flanges by means of a releasable bolt means, and the bolt means also carries resilient means for urging the clamps off of the tapered surfaces of the flanges when a disconnection is to be made. The bolt means is carried in opposed recesses in the flanges and can be held in assembled relationship on one of the flanges by means of a centrally located pilot means. The piloting means is carried by one of the flanges and acts to pilot the other flange in proper relationship thereto. Thus, in the disconnected position, one of the flanges carries the bolt means, the clamps, the resilient means, all of which are supported on one of the flanges by means of the piloting means.

A more limited aspect of the present invention relates to a quick disconnect coupling of the above type in which one of the flanges is secured to a yoke of a universal joint. In that combination, the axis of the bolt means is located in the same longitudinal plane as the yoke to which it is attached, thereby minimizing couple forces on the joint.

These and other objects and advantages of the present invention will appear hereinafter as this disclosure progresses, reference being had to the accompanying drawings.

BRIEF DESCRIPTION OF THE DRAWINGS

FIG. 1 is a perspective view of a coupling made in accordance with the present invention and applied to a universal joint of a power transmission;

FIG. 2 is a view similar to FIG. 1, but showing one of the flanges removed and the bolt means and clamps in an uncoupled position;

FIG. 3 is a view similar to FIG. 1, but showing the coupling turned approximately 90°, the view furthermore showing one of the flanges and one of the torque transmitting means in an exploded position;

DESCRIPTION OF A PREFERRED EMBODIMENT

Figure 5:
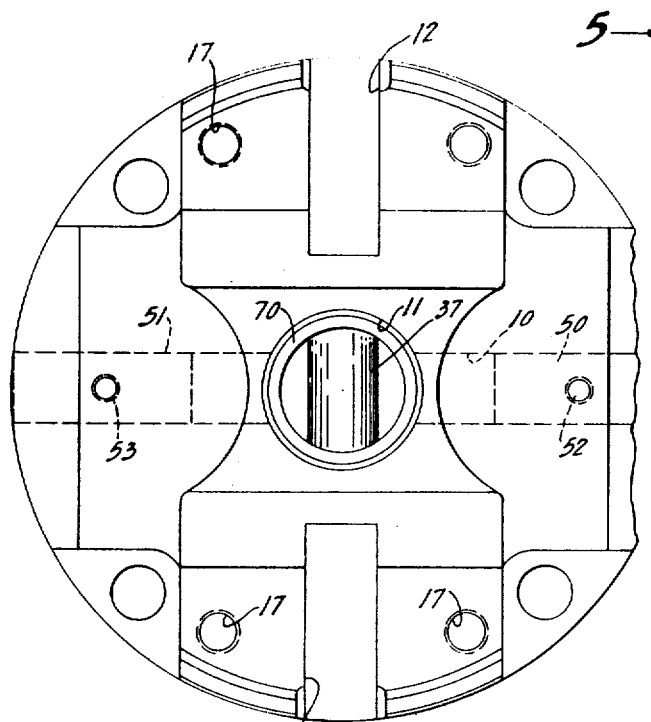
FIG. 5 is a transverse, elevational view taken along line 5—5 in FIG. 4.

The present invention finds particular utility when used with a universal joint J which has a pair of yokes 1 and 2 that are pivotally connected together on the axes 3 and 4 in the known manner.

The coupling comprises a first flange F having a generally transverse surface 5 and a pair of diametrically spaced, tapered clamping surfaces 6 and 7 which are located adjacent the transverse surface 5, one such tapered clamping surface being located on each of diametrically opposite sides of the coupling.

The first flange F also has a transverse recess 9 for the reception of a bolt means to be described. Furthermore, the first flange has a key-way 10 extending through its transverse surface 5 and generally at 90° to the recess 9. A central, axially disposed aperture 11 extends through the first flange for the reception of a piloting means to be described.

Means for fastening the first flange F to the yoke 2 of the universal joint J includes the radial slots 12 and 13 in one axial end of the flange F and bolt means 15 extend through the yoke 2 and are threadably engaged in the threaded holes 17 at the rear face of the flange F. Thus the flange F is adapted to be attached to a first transmission member such as the universal joint J.

The coupling also includes a second flange F2 having a generally transverse surface 20 that is adapted to be disposed adjacent the first flange transverse surface 5 while in the coupling position. A pair of circumferentially spaced surfaces 22 and 23 are provided on the second flange F2, one adjacent each of the tapered surfaces 6 and 7 of the first flange and forming therewith a pair of opposed clamping surfaces at diametrically opposite sides of the coupling. The second flange also has a recess 25 arranged transversely across its surface 20 and complementary and opposed to the recess 9 of the first flange. The second flange has means for attachment to a second transmission member (not shown) and this means includes a series of apertures 27 extending axially through its radially extending portion 28, which apertures receive attaching bolts (not shown). The second flange also has a central aperture 29 which is in alignment with the central axially disposed aperture 11 of the first flange F.

Figure 4:
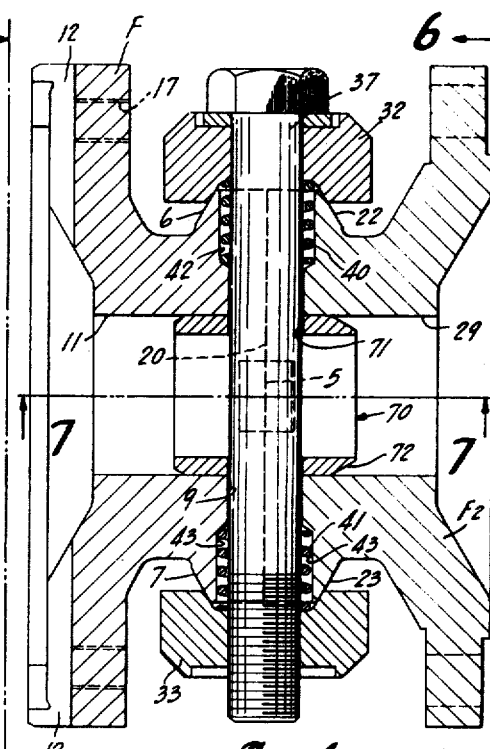
FIG. 4 is a transverse, sectional view through the coupling shown in FIG. 1, the view being taken generally along the line 4—4 in FIG. 6.
Figure 6:
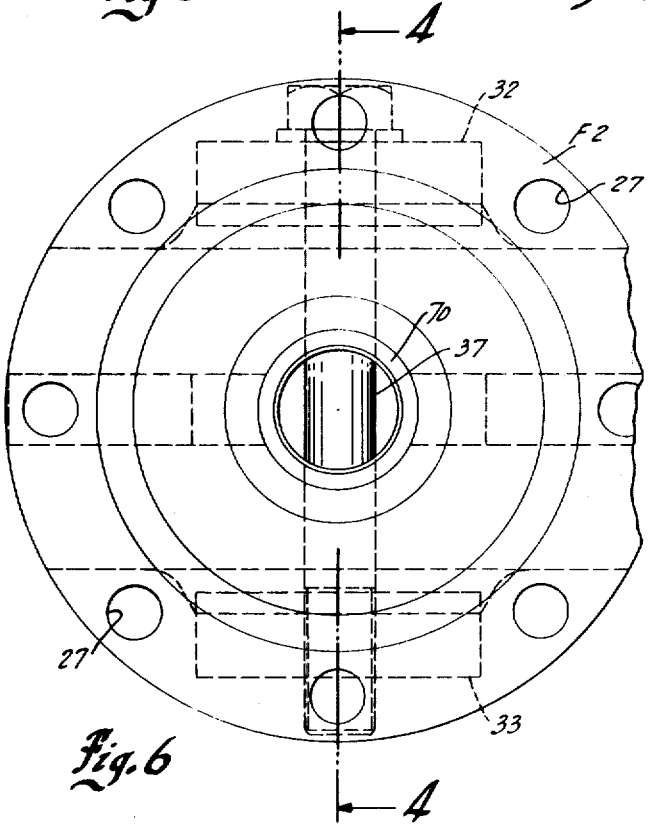
FIG. 6 is another transverse, elevational view taken along line 6—6 in FIG. 4.
Figure 7:
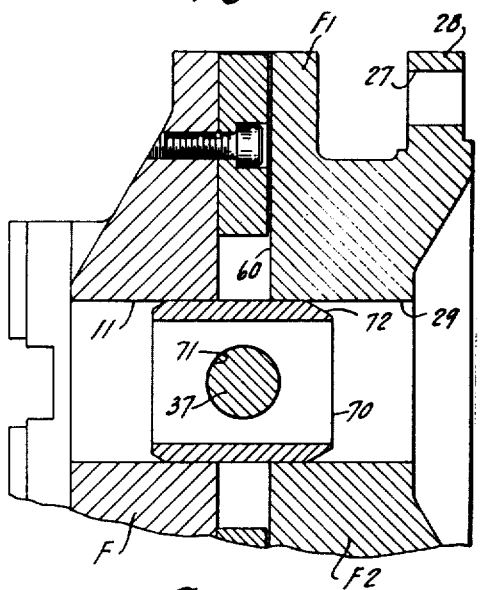
FIG. 7 is a fragmentary, longitudinal sectional view taken along the line 7—7 in FIG. 4.

Means are provided for urging the opposed clamping surfaces 6 and 22 toward one another, and also urging opposed clamping surfaces 7 and 23 toward one another. This means includes a pair of clamps 32 and 33 having internally tapered and opposed surfaces abuttable against the respective tapered surfaces 6, 22 and 7, 23 of the flanges, as shown clearly in FIG. 4. The clamp 32 has a central aperture by means of which it is slideably mounted on the bolt means 37. The bolt means 37 is threadably engaged in the threaded aperture 38 in clamp 33. A pair of coil springs 40 and 41 are mounted on the bolt means 37 in appropriate recesses 42 and 43 in the flanges F and F2, respectively.

When the bolt 37 is tightened into the threaded clamp 33, and the parts are otherwise assembled, the clamps 32 and 33 are drawn radially inwardly to abut their respective tapered surfaces of the flanges, thereby axially drawing the flanges F and F2 tightly together. When the coupling is to be released, the bolt is backed-off or loosened from clamp 33, and the springs 40 and 41 act to bias the clamps radially outwardly and out of engagement with the tapered surfaces of the flanges, thereby permitting the flanges F and F2 to be axially separated.

Driving means are provided between the flanges for transmitting driving torque therebetween. This driving means may comprise a pair of keys 50 and 51 which are held by the cap screws 52 and 53, respectively in the recess 10 of one of the flanges, such as flange F. The keys 50 and 51 are also located in a corresponding key-way 60 of flange F2 when the coupling is assembled so the removable keys 50 and 51 furnish a torque transmitting driving means between the flanges.

Piloting means are provided between the flanges for facilitating their assembly, that is to say for providing that one of the flanges can be readily located adjacent the other flange in proper relationship and maintaining concentricity between drive and driven parts. This piloting means includes member 70 which is press fit into the central aperture of flange F. This member 70 has an aperture 71 through which the bolt 37 can pass and be held therein. The nose 72 of the member 70 is tapered so as to facilitate its entry into the central aperture 29 of flange F2.

When the coupling is disconnected, it will be noted that the bolt 37, the clamps 32 and 33, the springs 40 and 41, and the piloting means 72 are all held in assembled position and are mounted on the flange F2 by means of the piloting means 70, consequently, the parts cannot become misplaced or lost. It is an easy matter to again connect the coupling, it being necessary only to pilot the flange F2 on the piloting means 70, place the clamps 32 and 33 over the adjacent and respective tapered surfaces of the flanges, and then tighten the bolt 37.

The flange F is rigidly secured to the yoke 2 of the universal joint and it will be noted that the bolt means is located in the same longitudinal plane as is the yoke 2 to which the flange F is secured. By so aligning the bolt means and the yoke in the longitudinal direction, that is to say, by aligning them circumferentially and in an axial direction, the couple forces on the joint are minimized. Stated otherwise, in a universal joint, there are second order forces, which occur twice for every revolution of the joint and these forces are a function of the joint angle. By providing the bolt clamping means in the same plane as the yoke 2 to which its flange is attached, the couple forces on the clamp due to the U-joint secondary couples are minimized.

The quick disconnect coupling of the present invention finds particular utility when used in combination with a universal joint. The flanges are readily disconnectible by the quick releasable spring loaded clamps and the entire clamping mechanism is held in assembled relationship on one of the flanges.

We claim:

1. A quick disconnect coupling for a power transmission or the like and comprising; a first flange having a pair of circumferentially spaced tapered clamping surfaces, and means on said first flange for rigidly securing said first flange to a first transmission member; a second flange having a pair of circumferentially spaced tapered surfaces, one adjacent each of said tapered surfaces of said first flange and forming therewith a pair of opposed clamping surfaces at generally diametrically opposite sides of said coupling, means on said second flange for attachment to a second transmission member; bolt means between said flanges, a pair of tapered clamps on said bolt means, one engageable over each of the said pair of diametrically opposite and opposed clamping surfaces whereby when said bolt means is tightened, said opposed clamping surfaces are drawn by said tapered clamps and towards one another to clamp said first and second flanges together, resilient means acting on said tapered clamps to urge the latter radially outwardly away from their respective clamping surfaces to a flange uncoupled position, and driving means between said flanges for forming a torque transmitting connection therebetween.

2. The coupling set forth in claim 1 including piloting means carried centrally by one of said flanges for piloting the other flange thereon.

3. The coupling described in claim 2 further characterized in that one of said flanges have a generally central opening therein, and said piloting means comprises a member in one of said openings and carried by said bolt means, said member adapted to be insertable in the opening of the other of said flanges.

4. The coupling set forth in claim 1 further characterized in that said driving means includes key-way means in said flanges and key means removably mounted in said key-way means.

5. The coupling set forth in claim 2 further characterized in that said driving means includes key-way means in said flanges and key means removably mounted in said key-way means.

6. The coupling set forth in claim 3 further characterized in that said driving means includes key-way means in said flanges and key means removably mounted in said key-way means.

7. A quick disconnect coupling for a power transmission comprising; a first flange having a generally transverse surface and a pair of diametrically spaced tapered clamping surfaces adjacent said transverse surface, a transverse recess in said transverse surface, and means for being rigidly secured to a first transmission member; a second flange having a generally transverse surface for being disposed adjacent the first flange transverse surface, a pair of diametrically spaced tapered surfaces, one adjacent each of said tapered surfaces of said first flange and forming therewith a pair of opposed clamping surfaces at each side of said coupling, a recess formed in said second flange and complementary to said first flange recess, means on said second flange for attachment to a second transmission member; bolt means in said recesses, a pair of tapered clamps on said bolt means, one engageable over each of the said pair of opposed clamping surfaces whereby when said bolt means is tightened, said opposed clamping surfaces are drawn tightly by said tapered clamps and towards one another to clamp said first and second flanges together, resilient means on said bolt means and acting on said tapered clamps to urge the latter radially outwardly away from their respective clamping surfaces to a flange uncoupled position, and driving means between said flanges for forming a torque transmitting connection therebetween.

8. In combination with a universal joint having a pair of yokes pivotally mounted together, a quick disconnect coupling comprising; a first flange having a pair of circumferentially spaced tapered clamping surfaces, and means on said first flange for rigidly securing said first flange to one of said yokes, a second flange having a pair of circumferentially spaced tapered surfaces, one adjacent each of said tapered surfaces of said first flange and forming therewith a pair of opposed clamping surfaces at generally diametrically opposite sides of said coupling, means on said second flange for attachment to a transmission member; bolt means between said flanges, a pair of tapered clamps on said bolt means, one engageable over each of said pair of diametrically opposite and opposed clamping surfaces whereby when said bolt means is tightened, said opposed clamping surfaces are drawn by said tapered clamps and towards one another to clamp said first and second flanges together, and resilient means acting on said tapered clamps to urge the latter radially outwardly away from their respective clamping surfaces to a flange uncoupled position.

9. The combination set forth in claim 8 including means for detachably securing said first flange to said yoke.

* * * * *